United States Patent
Shimizu et al.

(10) Patent No.: US 12,458,949 B2
(45) Date of Patent: Nov. 4, 2025

(54) GAS SEPARATION METHOD AND ZEOLITE MEMBRANE

(71) Applicant: NGK Insulators, Ltd., Nagoya (JP)

(72) Inventors: Katsuya Shimizu, Kasugai (JP); Makiko Ichikawa, Nagoya (JP); Kenji Yajima, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 540 days.

(21) Appl. No.: 17/931,918

(22) Filed: Sep. 14, 2022

(65) Prior Publication Data

US 2023/0018523 A1    Jan. 19, 2023

Related U.S. Application Data

(63) Continuation of application No. PCT/JP2021/004990, filed on Feb. 10, 2021.

(30) Foreign Application Priority Data

Mar. 18, 2020 (JP) .................................. 2020-047803

(51) Int. Cl.
*B01D 53/22* (2006.01)
*B01D 53/04* (2006.01)
(Continued)

(52) U.S. Cl.
CPC .............. *B01J 20/18* (2013.01); *B01D 53/04* (2013.01); *B01D 53/62* (2013.01); *B01D 69/108* (2022.08);
(Continued)

(58) Field of Classification Search
CPC ..... B01J 20/18; B01J 20/28033; B01D 53/04; B01D 53/62; B01D 69/108;
(Continued)

(56) References Cited

U.S. PATENT DOCUMENTS 11,278,846 B2 * 3/2022 Gu ........................... C10L 3/104
2004/0173094 A1 * 9/2004 Nakayama ......... B01D 71/0281
  95/45

(Continued)

FOREIGN PATENT DOCUMENTS

JP    2012-236123 A    12/2012
JP    2014-000535 A    1/2014
(Continued)

OTHER PUBLICATIONS

English translation of the International Preliminary Report on Patentability (Chapter I) dated Sep. 29, 2022 (Application No. PCT/JP2021/004990).

(Continued)

*Primary Examiner* — Frank M Lawrence, Jr.
(74) *Attorney, Agent, or Firm* — BURR PATENT LAW, PLLC (57) ABSTRACT

A gas separation method includes supplying a mixed gas to a zeolite membrane complex and permeating a high permeability gas through the zeolite membrane complex to separate the high permeability gas from other gases. The mixed gas includes a high permeability gas and a trace gas that is lower in concentration than the high permeability gas. The trace gas contains an organic substance whose molar concentration in the mixed gas is higher than or equal to 1.0 mol %. The adsorption equilibrium constant of the organic substance on the zeolite membrane is less than 150 times the adsorption equilibrium constant of the high permeability gas.

6 Claims, 2 Drawing Sheets

(51) Int. Cl.
    *B01D 53/62*     (2006.01)
    *B01D 69/10*     (2006.01)
    *B01D 69/12*     (2006.01)
    *B01D 71/02*     (2006.01)
    *B01J 20/18*     (2006.01)
    *B01J 20/28*     (2006.01)

(52) U.S. Cl.
    CPC ..... *B01D 69/1213* (2022.08); *B01D 69/1218* (2022.08); *B01D 71/0215* (2022.08); *B01J 20/28033* (2013.01); *B01D 2253/108* (2013.01); *B01D 2257/504* (2013.01)

(58) Field of Classification Search
    CPC ............ B01D 69/1213; B01D 69/1218; B01D 71/0215; B01D 2253/108; B01D 2257/504; B01D 2256/245; B01D 2257/10; B01D 2257/20; B01D 2257/30; B01D 2257/40; B01D 2257/70; B01D 2257/708; B01D 53/228; B01D 53/22; Y02C 20/40; C01B 39/02
    USPC ............... 95/43, 45, 47, 51, 54, 55; 96/4, 11
    See application file for complete search history.

(56) References Cited

U.S. PATENT DOCUMENTS

| | | | |
|---|---|---|---|
| 2012/0240763 A1* | 9/2012 | Liu | ................... B01J 20/3078 502/4 |
| 2014/0144321 A1 | 5/2014 | Sawamura et al. | |
| 2014/0360938 A1 | 12/2014 | Hayashi et al. | |
| 2014/0360939 A1* | 12/2014 | Yamada | ................. B01D 69/02 210/500.25 |
| 2017/0189862 A1 | 7/2017 | Imasaka et al. | |
| 2017/0190640 A1 | 7/2017 | Noda | |
| 2019/0224630 A1 | 7/2019 | Imasaka et al. | |
| 2020/0406202 A1* | 12/2020 | Miyahara | ............. B01D 69/108 |
| 2023/0114715 A1* | 4/2023 | Ogasawara | ........ B01J 20/28004 585/818 |

FOREIGN PATENT DOCUMENTS

| | | |
|---|---|---|
| JP | 2016-155098 A | 9/2016 |
| JP | 2019-181456 A | 10/2019 |
| JP | 2020-157275 A | 10/2020 |
| WO | 2012/153808 A1 | 11/2012 |
| WO | 2013/125660 A1 | 8/2013 |
| WO | 2016/006564 A1 | 1/2016 |
| WO | 2016/052058 A1 | 4/2016 |
| WO | 2017/142056 A1 | 8/2017 |

OTHER PUBLICATIONS

Japanese Office Action (Application No. 2022-508134) dated Jun. 15, 2023 (with English translation) (8 pages).

Inés Tiscornia, et al., "Separation of Propylene/Propane Mixtures by Titanosilicate ETS-10 Membranes Prepared in One-Step Seeded Hydrothermal Synthesis," Journal of Membrane Science, 311 (2008), pp. 326-335.

International Search Report and Written Opinion (Application No. PCT/JP2021/004990) dated Apr. 6, 2021 (with English translation).

* cited by examiner

GAS SEPARATION METHOD AND ZEOLITE MEMBRANE

CROSS-REFERENCE TO RELATED APPLICATION

The present application is a continuation application of International Application No. PCT/JP2021/004990 filed on Feb. 10, 2021, which claims the benefit of priority to Japanese Patent Application No. 2020-047803 filed on Mar. 18, 2020. The entire contents of these applications are incorporated herein by reference.

TECHNICAL FIELD

The present invention relates to a gas separation method of separating a mixed gas, and a zeolite membrane formed on a porous support.

BACKGROUND ART

At present, there is demand for the ability to separate a specific component from a combustion exhaust gas or any other gas produced in a chemical plant. For example, Japanese Patent Application Laid-Open No. 2012-236123 (Document 1) proposes a system for separating and collecting carbon dioxide in an exhaust gas by permeating carbon dioxide through a zeolite membrane. International Publication No. WO2016/052058 (Document 2) proposes a technique for separating an olefin compound from a fluid to be processed, using a zeolite membrane.

The separation of carbon dioxide in an exhaust gas, as described in Document 1, may cause a time-varying reduction in permeability of a zeolite membrane due to minor components contained in the exhaust gas being adsorbed on small pores of the zeolite membrane (see Ines Tiscomia et. al., "Separation of propylene/propane mixtures by titanosilicate ETS-10 membranes prepared in one-step seeded hydrothera synthesis," Journal of Membrane Science 311 (2008), p. 326-335 (Document 3)). In the case of separating carbon dioxide or the like from an exhaust gas produced in a plant such as an olefin production plant, a synthetic alcohol production plant, or an ester production plant, the minor components may, for example, be olefin, alcohol, ester, or carboxylic acid that is an end product, an unreacted raw material, or an intermediate product.

Document 1 proposes to guide the exhaust gas to a pretreatment facility before the exhaust gas is supplied to the zeolite membrane and to remove moisture in the exhaust gas in the pretreatment facility to reduce moisture content. Meanwhile, Document 2 describes performing processing for reducing a compound of acetylene series, processing for reducing a sulfur compound, or processing for reducing a fine particle composition in a pre-treatment unit.

Incidentally, since the variety of minor substances contained in the exhaust gas or any other gas is wide, the pretreatment facility may be upsized or may become complicated if all of these minor substances are to be removed in the pretreatment facility in order to suppress a time-varying change in permeability of the zeolite membrane.

SUMMARY OF THE INVENTION

The present invention is intended for a gas separation method of separating a mixed gas, and it is an object of the present invention to easily suppress a time-varying reduction in permeability of a zeolite membrane.

A gas separation method according to a preferable embodiment of the present invention includes a) preparing a zeolite membrane complex that includes a porous support and a zeolite membrane formed on the support, and b) supplying a mixed gas that includes a high permeability gas and a trace gas to the zeolite membrane complex, the trace gas being lower in concentration than the high permeability gas, and permeating the high permeability gas through the zeolite membrane complex to separate the high permeability gas from other gases. The trace gas contains an organic substance whose molar concentration in the mixed gas is higher than or equal to 1.0 mol %, and an adsorption equilibrium constant of the organic substance on the zeolite membrane is less than 150 times an adsorption equilibrium constant of the high permeability gas on the zeolite membrane.

Accordingly, it is possible to easily suppress a time-varying reduction in permeability of the zeolite membrane.

Preferably, the high permeability gas is hydrogen, nitrogen, oxygen, or carbon dioxide.

Preferably, the zeolite membrane contains a zeolite crystal whose maximum number of membered rings is 8.

Preferably, the gas separation method described above further includes, before the operation b), removing an organic substance from the mixed gas, an adsorption equilibrium constant of the organic substance on the zeolite membrane being 150 times or more the adsorption equilibrium constant of the high permeability gas on the zeolite membrane.

Preferably, the mixed gas further includes a low permeability gas to which the zeolite membrane has lower permeability than to the high permeability gas. In the mixed gas, the trace gas is lower in concentration than the low permeability gas.

Preferably, the mixed gas contains one or more types of substances selected from among hydrogen, helium, nitrogen, oxygen, water, water vapor, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

The present invention is also intended for a zeolite membrane formed on a porous support. In a zeolite membrane according to a preferable embodiment of the present invention, when a mixed gas that includes a high permeability gas and a trace gas is supplied to the zeolite membrane, the trace gas being lower in concentration than the high permeability gas and containing an organic substance whose adsorption equilibrium constant is less than 150 times an adsorption equilibrium constant of the high permeability gas, a permeance ratio of P40/P10 is higher than or equal to 0.85 and lower than or equal to 1.00 in a state in which a molar concentration of the organic substance in the mixed gas is higher than or equal to 1.0 mol % and lower than or equal to 6.0 mol %.

Accordingly, it is possible to easily suppress a time-varying reduction in permeability of the zeolite membrane.

Preferably, the high permeability gas is hydrogen, nitrogen, oxygen, or carbon dioxide.

Preferably, the mixed gas further includes a low permeability gas to which the zeolite membrane has lower permeability than to the high permeability gas. In the mixed gas, the trace gas is lower in concentration than the low permeability gas.

These and other objects, features, aspects and advantages of the present invention will become more apparent from the following detailed description of the present invention when taken in conjunction with the accompanying drawings.

DESCRIPTION OF EMBODIMENTS

Figure 1:
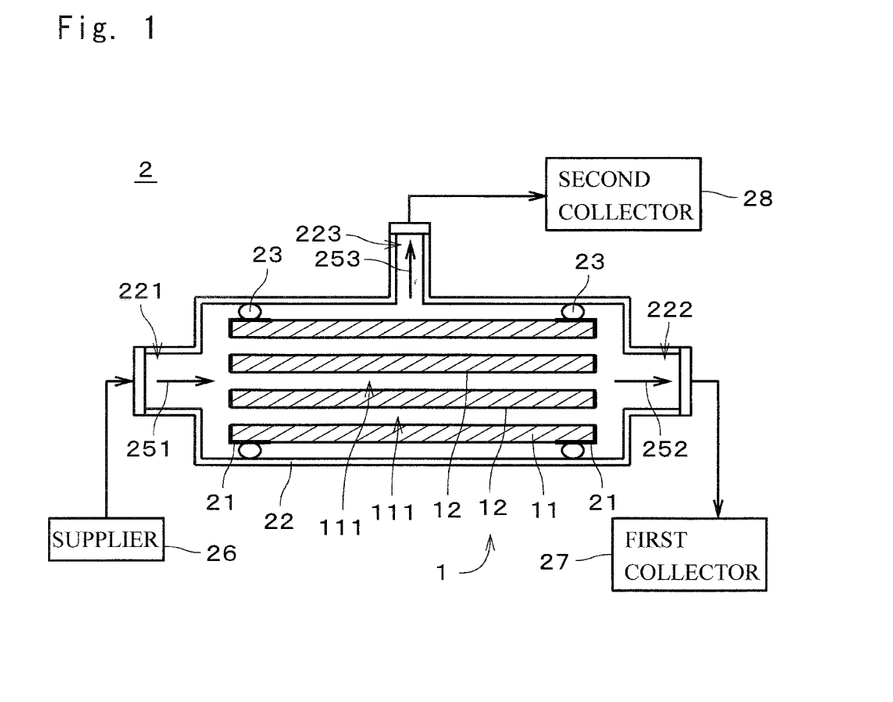
FIG. 1 is an illustration of a separation device.

FIG. 1 is an illustration of a general structure of a separation device 2 according to one embodiment of the present invention. The separation device 2 is a device that supplies a mixed gas including a plurality of types of gases to a zeolite membrane complex 1 and permeates a high permeability gas included in the mixed gas through the zeolite membrane complex 1 so as to separate the high permeability gas from the mixed gas. For example, the separation conducted by the separation device 2 may be for the purpose of extracting the high permeability gas from the mixed gas, or for the purpose of concentrating a low permeability gas.

For example, the mixed gas may contain one or more types of substances selected from among hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxides, ammonia ($NH_3$), sulfur oxides, hydrogen sulfide ($H_2S$), sulfur fluorides, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

Nitrogen oxides are compounds of nitrogen and oxygen. For example, the aforementioned nitrogen oxides may be gases called NOx such as nitrogen monoxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), or dinitrogen pentoxide ($N_2O_5$).

Sulfur oxides are compounds of sulfur and oxygen. For example, the aforementioned sulfur oxides may be gases called SOx such as sulfur dioxide ($SO_2$) or sulfur trioxide ($SO_3$).

Sulfur fluorides are compounds of fluorine and sulfur. For example, the aforementioned sulfur fluorides may be disulfur difluoride (F—S—S—F, S=$SF_2$), sulfur difluoride ($SF_2$), sulfur tetrafluoride ($SF_4$), sulfur hexafluoride ($SF_6$), or disulfur decafluoride ($S_2F_{10}$).

C1 to C8 hydrocarbons are hydrocarbons that contain one or more and eight or less carbon atoms. C3 to C8 hydrocarbons each may any of a linear-chain compound, a side-chain compound, and a cyclic compound. C3 to C8 hydrocarbons each may also be either of a saturated hydrocarbon (i.e., where double bonds and triple bonds are not located in molecules) and an unsaturated hydrocarbon (i.e., where double bonds and/or triple bonds are located in molecules). C1 to C4 hydrocarbons may, for example, be methane ($CH_4$), ethane ($C_2H_6$), ethylene ($C_2H_4$), propane ($C_3H_8$), propylene ($C_3H_6$), normal butane ($CH_3(CH_2)_2CH_3$), isobutene ($CH(CH_3)_3$), 1-butene ($CH_2$=$CHCH_2CH_3$), 2-butene ($CH_3CH$=$CHCH_3$), or isobutene ($CH_2$=$C(CH_3)_2$).

The aforementioned organic acid may, for example, be carboxylic acid or sulfonic acid. For example, carboxylic acid may be formic acid ($CH_2O_2$), acetic acid ($C_2H_4O_2$), oxalic acid ($C_2H_2O_4$), acrylic acid ($C_3H_4O_2$), or benzoic acid ($C_6H_5COOH$). Sulfonic acid may, for example, be ethane sulfonic acid ($C_2H_6O_3S$). The organic acid may be a chain compound, or may be a cyclic compound.

The aforementioned alcohol may, for example, be methanol ($CH_3OH$), ethanol ($C_2H_5OH$), isopropanol (2-propanol) ($CH_3CH(OH)CH_3$), ethylene glycol ($CH_2(OH)CH_2(OH)$), or butanol ($C_4H_9OH$).

Mercaptans are organic substances with terminal sulfur hydrides (SH) and are substances called also thiol or thio-alcohol. The aforementioned mercaptans may, for example, be methyl mercaptan ($CH_3SH$), ethyl mercaptan ($C_2H_5SH$), or 1-propane thiol ($C_3H_7SH$).

The aforementioned ester may, for example, be formic acid ester or acetic acid ester.

The aforementioned ether may, for example, be dimethyl ether (($CH_3)_2O$), methyl ethyl ether ($C_2H_5OCH_3$), or diethyl ether (($C_2H_5)_2O$).

The aforementioned ketone may, for example, be acetone (($CH_3)_2CO$), methyl ethyl ketone ($C_2H_5COCH_3$), or diethyl ketone (($C_2H_5)_2CO$).

The aforementioned aldehyde may, for example, be acetaldehyde ($CH_3CHO$), propionaldehyde ($C_2H_5CHO$), or butanal (butyraldehyde) ($C_3H_7CHO$).

The separation device 2 includes the zeolite membrane complex 1, a sealer 21, an outer cylinder 22, two seal members 23, a supplier 26, a first collector 27, and a second collector 28. The zeolite membrane complex 1, the sealer 21, and the seal members 23 are placed in the internal space of the outer cylinder 22. The supplier 26, the first collector 27, and the second collector 28 are arranged outside the outer cylinder 22 and connected to the outer cylinder 22. FIG. 1 omits an illustration of cross hatching in the section of part of the configuration.

The outer cylinder 22 is a generally cylindrical tube-like member. For example, the outer cylinder 22 may be formed of stainless steel or carbon steel. The longitudinal direction of the outer cylinder 22 is approximately parallel to the longitudinal direction of the zeolite membrane complex 1. One end of the outer cylinder 22 in the longitudinal direction (i.e., the end on the left side in FIG. 1) has a supply port 221, and the other end thereof has a first exhaust port 222. The side face of the outer cylinder 22 has a second exhaust port 223. The supply port 221 is connected to the supplier 26. The first exhaust port 222 is connected to the first collector 27. The second exhaust port 223 is connected to the second collector 28. The internal space of the outer cylinder 22 is an enclosed space isolated from the space around the outer cylinder 22.

The supplier 26 supplies a mixed gas to the internal space of the outer cylinder 22 via the supply port 221. For example, the supplier 26 may be a blower or a pump that pumps the mixed gas toward the outer cylinder 22. The blower or the pump includes a pressure regulator that controls the pressure of the mixed gas supplied to the outer cylinder 22. The first collector 27 and the second collector 28 may, for example, be reservoirs that store a gas delivered from the outer cylinder 22, or may be blowers or pumps that transfer the above gas.

The sealer 21 is a member that is attached to both ends of the support 11 in the longitudinal direction (i.e., in the left-right direction in FIG. 1) to cover and seal both end faces of the support 11 in the longitudinal direction and the outside surface of the support 11 in the vicinity of the both end faces. The sealer 21 prevents the inflow and outflow of gas from the both end faces of the support 11. For example, the sealer 21 may be a plate-like member formed of glass or resin. The material and shape of the sealer 21 may be appropriately changed. Note that the sealer 21 has a plurality of openings that overlap with a plurality of through holes 111 (described later) of the support 11, so that both ends of each through hole 111 of the support 11 in the longitudinal direction are not covered with the sealer 21. This allows the inflow and outflow of gas or the like from the both ends into and out of the through holes 111.

The two seal members 23 are arranged around the entire circumference between the outside surface of the zeolite membrane complex 1 and the inside surface of the outer cylinder 22 in the vicinity of the both ends of the zeolite membrane complex 1 in the longitudinal direction. Each seal member 23 is an approximately ring-shaped member formed of a material that is impermeable to gas. For example, the seal members 23 may be O-rings formed of resin having flexibility. The seal members 23 are in tight contact with the outside surface of the zeolite membrane complex 1 and the inside surface of the outer cylinder 22 along the entire circumference. In the example illustrated in FIG. 1, the seal members 23 are in tight contact with the outside surface of the sealer 21 and indirectly in tight contact with the outside surface of the zeolite membrane complex 1 via the sealer 21. The space between the seal members 23 and the outside surface of the zeolite membrane complex 1 and the space between the seal members 23 and the inside surface of the outer cylinder 22 are sealed so as to almost or completely disable the passage of gas.

Figure 2:
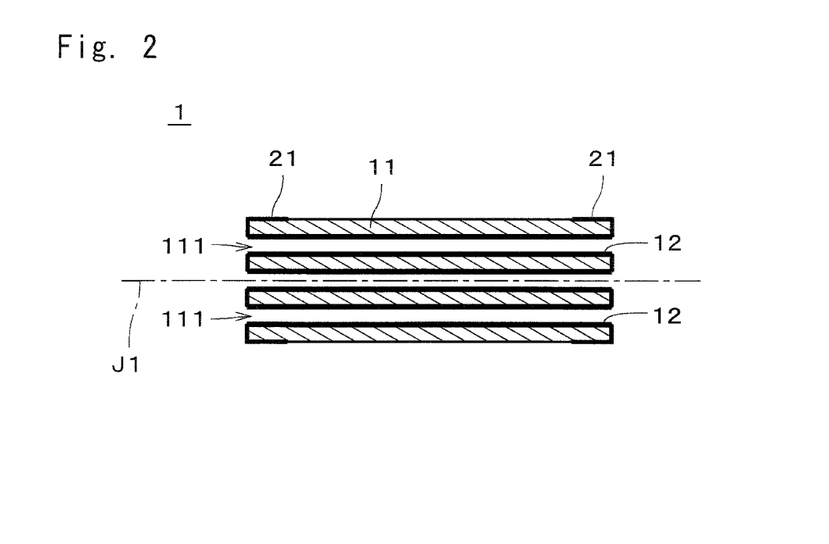
FIG. 2 is a sectional view of a zeolite membrane complex.
Figure 3:
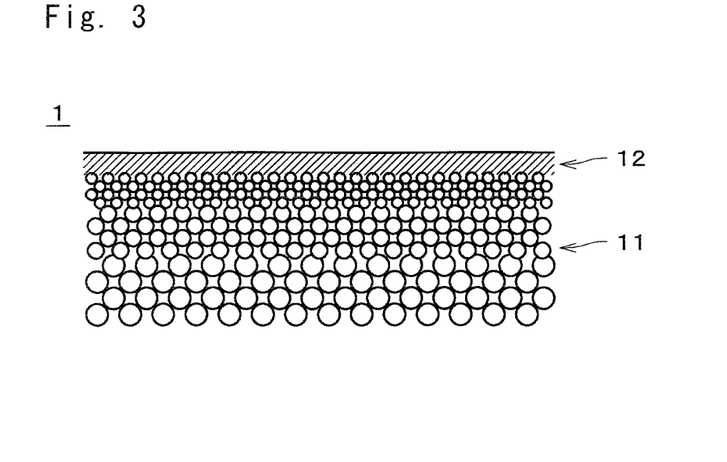
FIG. 3 is a sectional view showing part of the zeolite membrane complex in enlarged dimensions.

FIG. 2 is a sectional view of the zeolite membrane complex 1. FIG. 3 is a sectional view showing part of the zeolite membrane complex 1 in enlarged dimensions. The zeolite membrane complex 1 includes a porous support 11 and a zeolite membrane 12 formed on the support 11. The zeolite membrane 12 refers to at least a zeolite formed into a membrane on the surface of the support 11, and does not include zeolite particles that are merely dispersed in an organic membrane. The zeolite membrane 12 may contain two or more types of zeolites having different structures or different compositions. In FIG. 2, the zeolite membrane 12 is illustrated with bold lines. In FIG. 3, the zeolite membrane 12 is cross-hatched. In the illustration of FIG. 3, the zeolite membrane 12 has a thickness greater than its actual thickness.

The support 11 is a porous member that is permeable to gas. In the example illustrated in FIG. 1, the support 11 is a monolith support in which an integrally-molded column-like body has the plurality of through holes 111, each extending in the longitudinal direction (i.e., in the right-left direction in FIG. 2). In the example illustrated in FIG. 1, the support 11 has an approximately column-like shape. Each through hole 111 (i.e., cell) may have, for example, an approximately circular cross-sectional shape perpendicular to the longitudinal direction. In the illustration of FIG. 1, the through holes 111 have a diameter greater than its actual diameter, and the number of through holes 111 is smaller than the actual number of through holes 111. The zeolite membrane 12 is formed on the inside surfaces of the through holes 111 and covers approximately the entire inside surfaces of the through holes 111.

The support 11 has a length (i.e., length in the left-right direction in FIG. 1) of, for example, 10 cm to 200 cm. The support 11 has an outer diameter of, for example, 0.5 cm to 30 cm. The distance between the central axes of each pair of adjacent through holes 111 may, for example, be in the range of 0.3 mm to 10 mm. The surface roughness (Ra) of the support 11 may, for example, be in the range of 0.1 µm to 5.0 µm and preferably in the range of 0.2 µm to 2.0 µm. Alternatively, the support 11 may have a different shape such as a honeycomb shape, a flat plate-like shape, a tube-like shape, a cylinder-like shape, a column-like shape, or a polygonal prism shape. In the case where the support 11 has a tube- or cylinder-like shape, the support 11 may have a thickness of, for example, 0.1 mm to 10 mm.

The material for the support 11 may be any of a variety of substances (e.g., ceramic or metal) as long as the substance has chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttria, silicon nitride, and silicon carbide. In the present embodiment, the support 11 contains at least one type of alumina, silica, and mullite.

The support 11 may include an inorganic binder. The inorganic binder may be at least one of titania, mullite, easily sinterable alumina, silica, glass frit, clay minerals, and easily sinterable cordierite.

The support 11 may have a mean pore diameter of, for example, 0.01 µm to 70 µm and preferably 0.05 µm to 25 µm. The mean pore diameter of the support 11 in the vicinity of the surface on which the zeolite membrane 12 is formed is in the range of 0.01 µm to 1 µm and preferably in the range of 0.05 µm to 0.5 µm. The mean pore diameter may be measured by, for example, a mercury porosimeter, a perm porosimeter, or a nano-perm porosimeter. Referring to a pore size distribution of the support 11 as a whole including the surface and inside of the support 11, D5 may be in the range of, for example, 0.01 µm to 50 µm, D50 may be in the range of, for example, 0.05 µm to 70 µm, and D95 may be in the range of, for example, 0.1 µm to 2000 µm. The porosity of the support 11 in the vicinity of the surface on which the zeolite membrane 12 is formed may be in the range of, for example, 20% to 60%.

For example, the support 11 may have a multilayer structure in which a plurality of layers having different mean pore diameters are laminated one above another in the thickness direction. A surface layer that includes the surface on which the zeolite membrane 12 is formed has a smaller mean pore diameter and a smaller sintered particle diameter than the other layers (other than the surface layer). The mean pore diameter of the surface layer of the support 11 may be in the range of, for example, 0.01 µm to 1 µm and preferably in the range of 0.05 µm to 0.5 µm. In the case where the support 11 has a multilayer structure, the material for each layer may be any of the substances described above. The materials for the plurality of layers forming the multilayer structure may be the same, or may be different.

The zeolite membrane 12 is a porous membrane with small pores. The zeolite membrane 12 may be used as a separation membrane that separates a specific substance from a mixed gas including a plurality of types of gas, using a molecular-sieving function. The zeolite membrane 12 is less permeable to other gases than to a specific gas. In other words, the permeance of the zeolite membrane 12 to other gases is lower than the permeance of the zeolite membrane 12 to the specific gas described above.

The zeolite membrane 12 may have a thickness of, for example, 0.05 µm to 30 µm, preferably 0.1 µm to 20 µm, and more preferably 0.5 µm to 10 µm. Increasing the thickness of the zeolite membrane 12 improves selectivity. Reducing the thickness of the zeolite membrane 12 increases permeance. The surface roughness (Ra) of the zeolite membrane 12 may, for example, be less than or equal to 5 µm, preferably less than or equal to 2 µm, more preferably less than or equal to 1 µm, and yet more preferably less than or equal to 0.5 µm.

The mean pore diameter of the zeolite membrane 12 may be preferably greater than or equal to 0.2 nm and less than or equal to 0.8 nm, more preferably greater than or equal to 0.3 nm and less than or equal to 0.5 nm, and yet more preferably greater than or equal to 0.3 nm and less than or equal to 0.4 nm. The mean pore diameter of the zeolite membrane 12 is smaller than the mean pore diameter of the support 11 in the vicinity of the surface where the zeolite membrane 12 is formed.

The mean pore diameter is assumed to be an arithmetical mean of the major and minor axes of an n-membered ring pore, where n is the maximum number of membered rings in the zeolite of the zeolite membrane 12. In the case where the zeolite has a plurality of n-membered ring pores where n is the same number, the mean pore diameter is assumed to be an arithmetical mean of the major and minor axes of all of the n-membered ring pores. Note that the n-membered ring refers to a portion in which the number of oxygen atoms constituting the framework of a pore is n and that forms a cyclic structure as a result of each oxygen atom being bonded to a T atom described later. The n-membered ring also refers to a portion that forms a through hole (channel), and does not include a portion that fails to form a through hole. The n-membered ring pore refers to a small pore formed of an n-membered ring.

The mean pore diameter of the zeolite membrane is uniquely determined by the framework structure of the zeolite and can be obtained from a value disclosed in the "Database of Zeolite Structures" by the International Zeolite Association, [online], from the Internet <URL:http://www.iza-structure.org/databases/>.

There are no particular limitations on the type of the zeolite of the zeolite membrane 12, and examples of the zeolite include AEI-, AEN-, AFN-, AFV-, AFX-, BEA-, CHA-, DDR-, ERI-, ETL-, FAU- (X-type, Y-type), GIS-, LEV-, LTA-, MEL-, MFI-, MOR-, PAU-, RHO-, SAT-, and SOD-type zeolites. More preferable examples of the zeolite include AEI-, AFN-, AFV-, AFX-, CHA-, DDR-, ERI-, ETL-, GIS-, LEV-, LTA-, PAU-, RHO-, and SAT-type zeolites. Yet more preferable examples of the zeolite include AEI-, AFN-, AFV-, AFX-, CHA-, DDR-, ERI-, ETL-, GIS-, LEV-, PAU-, RHO-, and SAT-type zeolites.

The zeolite of the zeolite membrane 12 may contain, for example, Al as T atoms. The zeolite of the zeolite membrane 12 may, for example, be a zeolite that contains silicon (Si) and aluminum (Al) as atoms (T atoms) located in the center of an oxygen tetrahedron ($TO_4$) constituting the zeolite, an AlPO-type zeolite that contains Al and phosphorus (P) as the T atoms, an SAPO-type zeolite that contains Si, Al, and P as the T atoms, an MAPSO-type zeolite that contains magnesium (Mg), Si, Al, and P as the T atoms, or a ZnAPSO-type zeolite that contains zinc (Zn), Si, Al, and P as the T atoms. Some of the T atoms may be replaced by other elements.

The zeolite membrane 12 may contain, for example, Si. For example, the zeolite membrane 12 may contain any two or more of Si, Al, and P. The zeolite membrane 12 may contain alkali metal. The alkali metal may, for example, be sodium (Na) or potassium (K). In the case where the zeolite membrane 12 contains Si atoms, the Si/Al ratio in the zeolite membrane 12 may, for example, be higher than or equal to one and lower than or equal to a hundred thousand. The Si/Al ratio is preferably higher than or equal to 5, more preferably higher than or equal to 20, and yet more preferably higher than or equal to 100. A higher Si/Al ratio is more preferable. The Si/Al ratio in the zeolite membrane 12 may be adjusted by adjusting, for example, the compounding ratio of an Si source and an Al source in a starting material solution described later.

From the viewpoint of increasing $CO_2$ permeance and improving selectivity, it is preferable that the maximum number of membered rings in the zeolite is 8. For example, the zeolite membrane 12 may be a DDR-type zeolite. In other words, the zeolite membrane 12 is a zeolite membrane composed of a zeolite having a framework type code "DDR" assigned by the International Zeolite Association. In this case, the intrinsic pore diameter of the zeolite of the zeolite membrane 12 is 0.36 nm×0.44 nm and the mean pore diameter thereof is 0.40 nm.

The $CO_2$ permeance of the zeolite membrane 12 at a temperature of 20° C. to 400° C. may, for example, be higher than or equal to 100 nmol/$m^2$·s·Pa. The ratio (permeance ratio) between $CO_2$ permeance and $CH_4$ leakage (permeance) of the zeolite membrane 12 at a temperature of 20° C. to 400° C. may, for example, be higher than or equal to 100. The $CO_2$ permeance and the permeance ratio are values for the case where a difference in $CO_2$ partial pressure between the supply side and permeation side of the zeolite membrane 12 is 1.5 MPa.

Next, one example of the procedure for producing the zeolite membrane complex 1 will be described. In the production of the zeolite membrane complex 1, first, seed crystals for use in the production of the zeolite membrane 12 are prepared. For example, the seed crystals may be acquired from DDR-type zeolite powder synthesized by hydrothermal synthesis. This zeolite powder may be used as-is as the seed crystals, or may be processed into the seed crystals by pulverization or any other method.

Then, the porous support 11 is immersed in a solution in which the seed crystals are dispersed, so as to cause the seed crystals to adhere to the support 11. Alternatively, a solution in which the seed crystals are dispersed may be brought into contact with a portion of the surface of the support 11 on which the zeolite membrane 12 is desired to be formed, so as to cause the seed crystals to adhere to the support 11. In this way, a seed-crystal-deposited support is prepared. The seed crystals may be caused to adhere to the support 11 by any other method.

The support 11 with the seed crystals adhering thereto is immersed in a starting material solution. The starting material solution may be prepared by, for example, dissolving substances such as an Si source and a structure-directing agent (hereinafter, also referred to as an "SDA") in a solvent. The composition of the starting material solution may, for example, be 1.0 $SiO_2$: 0.015 SDA:0.12 $(CH_2)_2(NH_2)_2$. The solvent in the starting material solution may, for example, be water or alcohol such as ethanol. The SDA contained in the starting material solution may, for example, be an organic substance. The SDA may, for example, be 1-adamantanamine.

Then, the DDR-type zeolite is grown by hydrothermal synthesis using the seed crystals as nuclei, so as to form the DDR-type zeolite membrane 12 on the support 11. Preferably, the temperature of the hydrothermal synthesis may be in the range of 120 to 200° C., and may for example, be 160° C. Preferably, the hydrothermal synthesis time may be in the range of 10 to 100 hours and may, for example, be 30 hours.

After the completion of the hydrothermal synthesis, the support 11 and the zeolite membrane 12 are rinsed with deionized water. After the rinsing, the support 11 and the zeolite membrane 12 are dried at, for example, 80° C. After the support 11 and the zeolite membrane 12 have been dried, the zeolite membrane 12 is subjected to heat treatment so as to almost completely burn and remove the SDA in the zeolite membrane 12 and cause micropores in the zeolite membrane 12 to come through the zeolite membrane 12. In this way, the aforementioned zeolite membrane complex 1 is obtained.

Next, the procedure for separating a mixed gas, performed by the separation device 2, will be described with reference to FIG. 4. In the case of separating a mixed gas, the zeolite membrane complex 1 is first prepared by preparing the aforementioned separation device 2 (step S11).

Then, the supplier 26 supplies a mixed gas to the internal space of the outer cylinder 22, the mixed gas including a plurality of types of gases to which the zeolite membrane 12 has different permeability. The mixed gas includes a high permeability gas and a trace gas. The mixed gas may further include a low permeability gas. Hereinafter, a case is described in which the mixed gas includes a high permeability gas, a low permeability gas, and a trace gas. The trace gas is a component whose molar concentration (mol %) in the mixed gas is less than 10 mol %. The trace gas may be one type of gas, or may include two or more types of gas. In the case where the mixed gas includes two or more types of trace gas, the molar concentration of each type of trace gas in the mixed gas is less than 10 mol %, and a total molar concentration of the two or more types of trace gas in the mixed gas may be higher than 10 mol %. For example, the total molar concentration may be in the range of 1 mol % to 30 mol % and preferably in the range of 1 mol % to 10 mol %.

The high permeability gas and the low permeability gas are principal components of the mixed gas (i.e., components excluding the trace gas from the mixed gas). Among the principal components of the mixed gas, the high permeability gas is one type of gas to which the zeolite membrane 12 has highest permeability. The low permeability gas is a component that is obtained by excluding the high permeability gas from the principal components of the mixed gas and to which the zeolite membrane 12 has lower permeability than to the high permeability gas. The low permeability gas may be one type of gas or two or more types of gas. In other words, the mixed gas may include three or more types of gas as its principal components. The molar concentration of the high permeability gas in the mixed gas and the molar concentration of the low permeability gas in the mixed gas (if there are two or more types of gas, each type of low permeability gas) are higher than or equal to 10 mol %. The molar concentration of the trace gas in the mixed gas is lower than the molar concentration of the high permeability gas in the mixed gas and the molar concentration of the low permeability gas in the mixed gas (if there are two or more types of gas, each type of low permeability gas). A total content of the high permeability gas and the low permeability gas (i.e., the content of the principle components) in the mixed gas may be in the range of, for example, 70 mol % to 99 mol % and preferably in the range of 90 mol % to 99 mol %. The high permeability gas may, for example, be $H_2$, $N_2$, $O_2$, or $CO_2$. The low permeability gas may contain, for example, one or more types of $N_2$, air, and $CH_4$. In the present embodiment, the high permeability gas and the low permeability gas are $CO_2$ and $CH_4$, respectively.

The trace gas contains organic substances. Among the organic substances, an organic substance whose adsorption equilibrium constant on the zeolite membrane 12 is 150 times or more the adsorption equilibrium constant of the high permeability gas on the zeolite membrane 12 is referred to as a "high adsorbing gas." Among the organic substances, an organic substance whose adsorption equilibrium constant on the zeolite membrane 12 is less than 150 times the adsorption equilibrium constant of the high permeability gas on the zeolite membrane 12 is referred to as a "low adsorbing gas." A higher adsorption equilibrium constant relatively increases the tendency of the organic substance to be adsorbed on small pores of the zeolite membrane 12, and a lower adsorption equilibrium constant relatively reduces the tendency of the organic substance to be absorbed on small pores of the zeolite membrane 12. The molar concentration of the high adsorbing gas in the mixed gas is less than 1.0 mol %, preferably less than 0.05 mol %, and more preferably less than 0.025 mol %. The molar concentration of the low adsorbing gas in the mixed gas is higher than or equal to 1.0 mol % and preferably higher than or equal to 1.2 mol %.

The adsorption equilibrium constant of the high permeability gas on the zeolite membrane 12 can be calculated by, for example, conducting an adsorption test on the adsorption of the high permeability gas on the zeolite membrane 12 and creating a Langmuir plot from obtained measurement data, i.e., an adsorption isotherm. Specifically, zeolite powder of the same type as the zeolite membrane 12 (i.e., DDR-type zeolite powder) is first prepared. The Si/Al ratio in the zeolite powder is substantially the same as the Si/Al ratio in the zeolite membrane 12. Moreover, a glass container for the adsorption test is prepared, and the weight of the empty glass container is measured. Then, the zeolite powder with a predetermined weight is placed in the glass container. Then, the zeolite powder is heated and the glass container is evacuated in order to obtain vacuum atmosphere (i.e., produce a vacuum). Accordingly, adsorbents are desorbed from the zeolite powder. Thereafter, the weight of the glass container that contains the zeolite powder is measured, and the aforementioned weight of the empty glass container is subtracted from this measured weight to obtain the weight of the zeolite powder.

Processing described below is conducted in a state in which the temperature of a portion of the glass container in which the zeolite powder is placed is maintained at a predetermined temperature. The predetermined temperature is the same as the temperature at which the separation device 2 separates the mixed gas, and may, for example, be ambient temperature (25° C.). A predetermined amount of high permeability gas is introduced into the glass container in a vacuum atmosphere. In the glass container, some of the high permeability gas is adsorbed on the zeolite powder. This lowers the pressure inside the glass container. Upon confirmation of the fact that the pressure inside the glass container becomes constant and the adsorption of the high permeability gas on the zeolite powder becomes stabilized, pressure P inside the glass container is measured, and the amount of adsorption q of the high permeability gas is calculated, using the amount of reduction in pressure caused by the adsorption. Thereafter, the introduction of the high permeability gas into the glass container and the acquisition of the pressure P and the amount of adsorption q are repeated in the same manner as described above.

Then, the measured values of the pressure P and the amount of adsorption q are plotted, where P is the horizontal axis and P/q is the vertical axis. Then, the plotted points are subjected to collinear approximation by the least-squares method or any other method, so as to obtain an inclination a and an intercept b of an approximate straight line. Then, the adsorption equilibrium constant of the high permeability gas is calculated by dividing the inclination a by the intercept b. The adsorption equilibrium constants of the high adsorbing gas and the low adsorbing gas are also calculated by the same method described above.

The high adsorbing gas may be one type of organic substance, or may include a plurality of types of organic substances. In the case where the high adsorbing gas includes a plurality of types of organic substances, the molar concentration of the high adsorbing gas in the mixed gas is a total molar concentration of the plurality of types of organic substances. For example, the high adsorbing gas may be a gas that is an organic substance that contains carbon (C) and hydrogen (H) or an organic substance that contains carbon (C), hydrogen (H), and oxygen (O) and whose vapor pressure is less than 250 kPa at 25° C. For example, the high adsorbing gas may be vinyl acetate or ethanol. The low adsorbing gas may be one type of organic substance, or may contain a plurality of types of organic substances. In the case where the low adsorbing gas contains a plurality of types of organic substances, the molar concentration of the low adsorbing gas in the mixed gas is a total molar concentration of the plurality of types of organic substances. For example, the low adsorbing gas may be a gas that is an organic substance that contains carbon (C) and hydrogen (H) or an organic substance that contains carbon (C), hydrogen (H), and oxygen (O) and whose vapor pressure is higher than or equal to 250 kPa at 25° C. For example, the low adsorbing gas may be ethylene or propylene. The trace gas may contain a gas of inorganic material. Substantially the trace gas may not include the high adsorbing gas. In this case, the concentration of the high adsorbing gas in the mixed gas is substantially 0 mol %.

Figure 4:
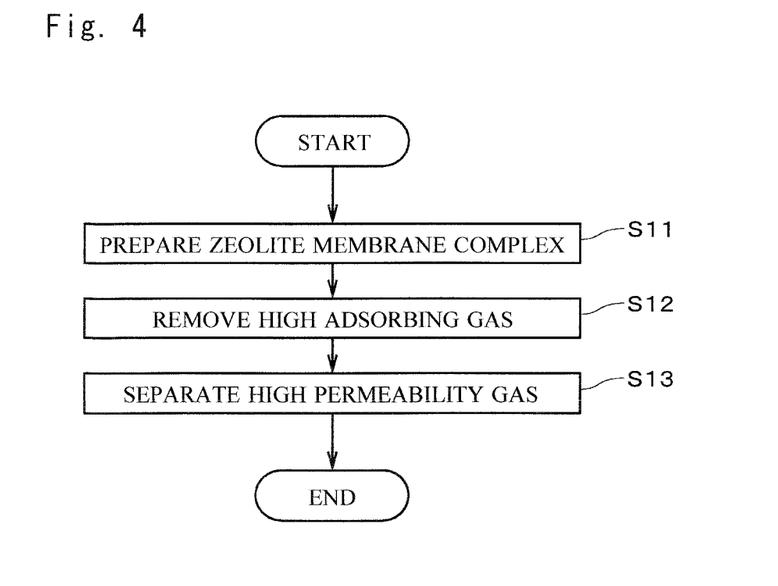
FIG. 4 is a flowchart for the separation of a mixed gas.

In the separation method illustrated by way of example in FIG. 4, the high adsorbing gas is removed from the mixed gas before the mixed gas is supplied to the separation device 2 (step S12). This lowers the molar concentration of the high adsorbing gas in the mixed gas. The removal of the high adsorbing gas in step S12 may be implemented by, for example, passing the mixed gas through a liquid that has high absorbency for the high adsorbing gas so as to cause the high adsorbing gas to be absorbed by the liquid. Alternatively, the removal of the high adsorbing gas may be implemented by passing the mixed gas through an adsorbent that has high adsorptivity for the high adsorbing gas so as to cause the high adsorbing gas to be adsorbed on the adsorbent. Note that the processing for removing the high adsorbing gas in step S12 needs only to be capable of lowering the molar concentration of the high adsorbing gas in the mixed gas, and there is no need to remove the entire volume of the high adsorbing gas in the mixed gas.

Note that step S12 intentionally does not include removal of the low adsorbing gas from the mixed gas. In other words, processing intended to remove the low adsorbing gas from the mixed gas is not performed in step S12. In this way, in step S12, the high adsorbing gas is selectively removed from the trace gas included in the mixed gas. This simplifies the pretreatment performed before the separation of the high permeability gas in step S13 described later. Note that step S12 may also include the removal of the low adsorbing gas.

After step S12 ends, the mixed gas with the high adsorbing gas removed therefrom is supplied from the supplier 26 to the outer cylinder 22. The pressure of the mixed gas supplied from the supplier 26 to the internal space of the outer cylinder 22 (i.e., initial pressure) may be in the range of, for example, 0.1 MPa to 20.0 MPa. The temperature at which the mixed gas is separated may be in the range of, for example, 10° C. to 200° C. The mixed gas supplied from the supplier 26 to the outer cylinder 22 is introduced from the left end of the zeolite membrane complex 1 in the drawing into each through hole 111 of the support 11 as indicated by an arrow 251. The high permeability gas (e.g., $CO_2$) in the mixed gas permeates through the zeolite membrane 12 provided on the inside surface of each through hole 111 and through the support 11 and is exhausted from the outside surface of the support 11. Accordingly, the high permeability gas is separated from other gases such as the low permeability gas (e.g., $CH_4$) in the mixed gas (step S13). The gas exhausted from the outside surface of the support 11 (hereinafter, referred to as the "permeated gas") is collected by the second collector 28 via the second exhaust port 223 as indicated by an arrow 253. The pressure of the gas collected by the second collector 28 via the second exhaust port 223 (i.e., permeation pressure) may, for example, be approximately 1 atmospheric pressure (0.101 MPa).

In the mixed gas, the gas (hereinafter, referred to as "non-permeated gas") other than the gas that has permeated through the zeolite membrane 12 and the support 11 passes through each through hole 111 of the support 11 from the left side to the right in FIG. 1 and is collected by the first collector 27 via the first exhaust port 222 as indicated by an arrow 252. For example, the pressure of the gas collected by the first collector 27 via the first exhaust port 222 may be approximately the same as the initial pressure. The non-permeated gas may include, in addition to the low permeability gas and the trace gas described above, a high permeability gas that has not permeated through the zeolite membrane 12.

As described above, in the separation method illustrated by way of example in FIG. 4, among the organic substances contained in the trace gas, the molar concentration of the high adsorbing gas in the mixed gas is low. This suppresses the adsorption of the organic substance contained in the trace gas on small pores of the zeolite membrane 12. Accordingly, it is possible to reduce the occurrence of a situation in which the high adsorbing gas adsorbed on the zeolite membrane 12 may inhibit the permeation of the high permeability gas through the zeolite membrane 12. As a result, it is possible to suppress a time-varying reduction in permeability of the zeolite membrane 12 to the high permeability.

Next, the relationship of the molar concentration of the high adsorbing gas in the mixed gas and the time-varying reduction in permeability of the zeolite membrane 12 to the high permeability gas will be described with reference to Table 1 and Table 2. The permeance ratio (P40/P10) shown in the table was obtained based on the permeance of the zeolite membrane complex 1 to gas after the mixed gas including the high permeability gas (e.g., $CO_2$) was supplied to the zeolite membrane complex 1 in the separation device 2 described above. Specifically, the permeance ratio (P40/P10) was obtained by dividing the aforementioned permeance after a lapse of 40 minutes since the supply of the mixed gas was started, by the aforementioned permeance after a lapse of 10 minutes since the supply of the mixed gas was started. The pressure of the mixed gas supplied from the supplier 26 was assumed to be 0.4 MPa, and the pressure of the gas collected by the second collector 28 (i.e., permeation pressure) was assumed to be approximately 1 atmospheric pressure (0.101 MPa). Note that the zeolite membrane 12 of the zeolite membrane complex 1 was a DDR-type zeolite.

TABLE 1

| | High Permeability Gas | | Low Permeability Gas | | Organic Compound in Trace Gas | |
|---|---|---|---|---|---|---|
| | Type | Molar Concentration (mol %) | Type | Molar Concentration (mol %) | Type | Molar Concentration (mol %) |
| Example 1 | $CO_2$ | 50 | $CH_4$ | 48.5 | ethylene | 1.5 |
| Example 2 | $CO_2$ | 50 | $CH_4$ | 48.5 | propylene | 1.5 |
| Example 3 | $CO_2$ | 50 | $CH_4$ | 48.5 | 1-butene | 1.5 |
| Comparative Example 1 | $CO_2$ | 50 | $CH_4$ | 48.5 | ethanol | 1.5 |
| Comparative Example 2 | $CO_2$ | 50 | $CH_4$ | 48.5 | vinyl acetate | 1.5 |
| Example 4 | $CO_2$ | 50 | $CH_4$ | 49 | ethylene | 1.0 |
| Example 5 | $CO_2$ | 50 | $CH_4$ | 49 | propylene | 1.0 |
| Example 6 | $CO_2$ | 50 | $CH_4$ | 49 | 1-butene | 1.0 |
| Comparative Example 3 | $CO_2$ | 50 | $CH_4$ | 49 | ethanol | 1.0 |
| Comparative Example 4 | $CO_2$ | 50 | $CH_4$ | 49 | vinyl acetate | 1.0 |

TABLE 2

| | Adsorption Equilibrium Constant of Organic Compound in Trace Gas / Adsorption Equilibrium Constant of High-Permeability Gas | Classification of Organic Compound in Trace Gas | Permeance Ratio P40/P10 |
|---|---|---|---|
| Example 1 | 9 | low adsorbing gas | 1.00 |
| Example 2 | 52 | low adsorbing gas | 0.98 |
| Example 3 | 134 | low adsorbing gas | 0.99 |
| Comparative Example 1 | 474 | high adsorbing gas | 0.09 |
| Comparative Example 2 | 406 | high adsorbing gas | 0.32 |
| Example 4 | 9 | low adsorbing gas | 1.00 |
| Example 5 | 52 | low adsorbing gas | 0.99 |
| Example 6 | 134 | low adsorbing gas | 0.99 |
| Comparative Example 3 | 474 | high adsorbing gas | 0.12 |
| Comparative Example 4 | 406 | high adsorbing gas | 0.41 |

In Examples 1 to 6 and Comparative Examples 1 to 4, the high permeability gas and the low permeability gas included in the mixed gas were respectively $CO_2$ and $CH_4$, and the type of the organic substance contained in the trace gas was varied. In Examples 1 to 6 and Comparative Examples 1 to 4, the molar concentration of the high permeability gas in the mixed gas was 50 mol %, and the molar concentration of the aforementioned organic substance were varied in the range of 1.0 mol % to 1.5 mol %. Note that the molar concentration of the low permeability gas in the mixed gas was obtained by subtracting the molar concentration of the high permeability gas and the molar concentration of the aforementioned organic substance from 100 mol %.

In Examples 1 to 3, the organic substances contained in the trace gas were respectively ethylene, propylene, and 1-butene. The adsorption equilibrium constant of ethylene on the zeolite membrane 12 (hereinafter, also simply referred to as the "adsorption equilibrium constant") was nine times the adsorption equilibrium constant of the high permeability gas. The adsorption equilibrium constants of propylene and 1-butene were respectively 52 times and 134 times the adsorption equilibrium constant of the high permeability gas. Thus, these organic substances in the trace gas were low adsorbing gas. The molar concentrations of these organic substances in the mixed gas were 1.5 mol %. The permeance ratios (P40/P10) were in the range of 0.98 to 1.00.

In Comparative Examples 1 and 2, the organic substances in the trace gas were respectively ethanol and vinyl acetate. The adsorption equilibrium constant of ethanol was 474 times the adsorption equilibrium constant of the high permeability gas. The adsorption equilibrium constant of vinyl acetate was 406 times the adsorption equilibrium constant of the high permeability gas. Thus, these organic substances in the trace gas were high adsorbing gas. As in Examples 1 to 3, the molar concentrations of these organic substances in the mixed gas were 1.5 mol %. The permeance ratios (P40/P10) were in the range of 0.09 to 0.32 and low.

Examples 4 to 6 and Comparative Examples 3 and 4 were the same as Example 1 to 3 and Comparative Examples 1 and 2, except that the molar concentration of the organic substance in the mixed gas was changed to 1.0 mol %. In Examples 4 to 6, the permeance ratios (P40/P10) were in the range of 0.99 to 1.00 and high, and in Comparative Examples 3 and 4, the permeance ratios (P40/P10) were in the range of 0.12 to 0.41 and low.

As described above, the gas separation method of separating a mixed gas includes the step of preparing the zeolite membrane complex 1 (step S11), and the step of supplying the mixed gas to the zeolite membrane complex 1 and permeating a high permeability gas through the zeolite membrane complex 1 to separate the high permeability gas from other gases (step S13). The zeolite membrane complex 1 includes the porous support 11 and the zeolite membrane 12 formed on the support 11. The mixed gas includes the high permeability gas and the trace gas that is lower in concentration than the high permeability gas. The trace gas contains an organic substance whose molar concentration in the mixed gas is higher than or equal to 1.0 mol %. The adsorption equilibrium constant of the organic substance on the zeolite membrane 12 is less than 150 times the adsorption equilibrium constant of the high permeability gas.

As described above, in the trace gas included in the mixed gas, the concentration of the organic substance (i.e., low adsorbing gas) whose adsorption equilibrium constant on the zeolite membrane 12 is less than 150 times the adsorption equilibrium constant of the high permeability gas and is relatively low is made higher than or equal to 1.0 mol %. This suppresses the adsorption of the organic substance contained in the trace gas on small pores of the zeolite membrane 12. For example, even if the trace gas contains an organic substance whose absorptivity for the zeolite membrane 12 is relatively high, the presence of the aforementioned low adsorbing gas inhibits the adsorption of the organic substance on the zeolite membrane 12. This reduces the occurrence of a situation in which the organic substance adsorbed on the zeolite membrane 12 may inhibit the permeation of the high permeability gas through the zeolite membrane 12. As a result, it is possible to suppress a time-varying reduction in permeability of the zeolite membrane 12. Besides, since there is no need to reduce the concentration of the low adsorbing gas to a value less than 1.0 mol %, it is possible to easily suppress a time-varying reduction in permeability.

Note that the organic substance contained in the trace gas is not limited to one type of organic substance, and the trace gas may contain a plurality of types of organic substances. In the case where the trace gas contains a plurality of types of organic substances, for an organic substance component whose molar concentration in the mixed gas is higher than or equal to 1.0 mol %, the adsorption equilibrium constant on the zeolite membrane 12 is determined to be less than 150 times the adsorption equilibrium constant of the high permeability gas. Meanwhile, for an organic substance component whose molar concentration in the mixed gas is lower than 1.0 mol %, there is no particular limitations on the adsorption equilibrium constant on the zeolite membrane 12. For example, in the case where the trace gas contains three types of organic substances including first to third organic substances, the molar concentration of the first organic substance (i.e., first organic substance component) in the mixed gas is higher than or equal to 1.0 mol %, the molar concentration of the second organic substance in the mixed gas is higher than or equal to 1.0 mol % in the mixed gas, and the molar concentration of the third organic substance in the mixed gas is lower than 1.0 mol %, the aforementioned adsorption equilibrium constants of the first and second organic substances are less than 150 times the adsorption equilibrium constant of the high permeability gas, and there are no particular limitations on the aforementioned adsorption equilibrium constant of the third organic substance.

As described above, among the organic substances contained in the trace gas, the concentration of an organic substance whose adsorption equilibrium constant on the zeolite membrane 12 is 150 times or more the adsorption equilibrium constant of the high permeability gas (i.e., high adsorbing gas) is preferably less than 0.05 mol %. By lowering the concentration of the high adsorbing gas in this way, it is possible to further suppress the adsorption of organic substances contained in the trace gas on small pores of the zeolite membrane 12 and to further reduce the occurrence of a situation in which the permeation of the high permeability gas through the zeolite membrane 12 may be inhibited by adsorbed organic substances. As a result, it is possible to further suppress a time-varying reduction in permeability of the zeolite membrane 12.

As described above, it is preferable that the high permeability gas is $H_2$, $N_2$, $O_2$, or $CO_2$. In this case, it is possible to efficiently separate $H_2$, $N_2$, $O_2$, or $CO_2$ while suppressing a time-varying reduction in permeability.

As described above, it is preferable that the maximum number of membered rings in a zeolite crystal contained in the zeolite membrane 12 is 8. In this case, it is possible to favorably achieve selective permeation of a gas with a relatively small molecular size in the zeolite membrane complex 1.

As described above, it is preferable that the gas separation method further includes the step of removing, from the mixed gas, an organic substance (i.e., high adsorbing gas) whose adsorption equilibrium constant on the zeolite membrane 12 is 150 times or more the adsorption equilibrium constant of the high permeability gas (step S12), step S12 being performed before step S13. This makes it possible to easily lower the molar concentration of the high adsorbing gas in the mixed gas (preferably to less than 0.05 mol %). As a result, it is possible to easily suppress a time-varying reduction in permeability of the zeolite membrane 12. Besides, in step S12, the high adsorbing gas is selectively removed without intentionally removing the low adsorbing gas. This simplifies the removal step in step S12. As a result, it is possible to more easily suppress a time-varying reduction in permeability of the zeolite membrane 12.

As described above, it is preferable that the mixed gas further includes a low permeability gas to which the zeolite membrane 12 has lower permeability than to the high permeability gas and that the concentration of the trace gas in the mixed gas is lower than the concentration of the low permeability gas in the mixed gas. In this case, it is possible to achieve a high permeance ratio during the separation of the high permeability gas from the low permeability gas.

The gas separation method described above is in particular suitable for the separation of a mixed gas that contains one or more types of substances selected from among hydrogen, helium, nitrogen, oxygen, water, water vapor, carbon monoxide, carbon dioxide, nitrogen oxides, ammonia, sulfur oxides, hydrogen sulfides, sulfur fluorides, mercury, arsine, hydrogen cyanide, carbonyl sulfide, C1 to C8 hydrocarbons, organic acid, alcohol, mercaptans, ester, ether, ketone, and aldehyde.

As described above, when the aforementioned mixed gas is supplied to the zeolite membrane 12 formed on the porous support 11 and in a state in which the molar concentration of the organic substance in the mixed gas is higher than or equal to 1.0 mol % and lower than or equal to 6.0 mol %, the permeance ratio (P40/P10) of the zeolite membrane 12 is higher than or equal to 0.85 and lower than or equal to 1.00. In this case, it is possible to easily suppress a time-varying reduction in permeability of the zeolite membrane 12 in the same manner as described above. Note that, as described above, the mixed gas includes the high permeability gas and the trace gas that is lower in concentration than the high permeability gas. The trace gas contains an organic substance whose adsorption equilibrium constant is less than 150 times the adsorption equilibrium constant of the high permeability gas.

As described above, the zeolite membrane 12 is in particular suitable for use in the separation of the mixed gas when the high permeability gas is $H_2$, $N_2$, $O_2$, or $CO_2$.

As described above, the zeolite membrane 12 is suitable for use in the separation of the high permeability gas from the low permeability gas when the mixed gas further includes a low permeability gas that is higher in concentration than the trace gas.

The gas separation method described above may be modified in various ways.

For example, the step of removing the high adsorbing gas from the mixed gas (step S12) may be omitted from the gas separation method described above.

As described above, the mixed gas does not necessarily have to include the low permeability gas as long as the mixed gas includes the high permeability gas and the trace gas. The high permeability gas does not necessarily have to be $H_2$, $N_2$, $O_2$, or $CO_2$, and may be a different gas other than these types of gas.

The maximum number of membered rings in the zeolite membrane 12 may be smaller than 8, or may be larger than 8.

The zeolite membrane complex 1 may further include a functional membrane or a protection membrane that is laminated on the zeolite membrane 12, in addition to the support 11 and the zeolite membrane 12. The functional membrane or the protection membrane may be an inorganic membrane such as a zeolite membrane, a silica membrane, or a carbon membrane, or may be an organic membrane such as a polyimide membrane or a silicone membrane. Besides, a substance that has high absorbency for $CO_2$ may be added to the functional or protection membrane laminated on the zeolite membrane 12.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL APPLICABILITY

The gas separation method according to the present invention is applicable in various fields in which the separation of a gas is conducted.

REFERENCE SIGNS LIST 1 zeolite membrane complex
11 support
12 zeolite membrane
S11 to S13 step

The invention claimed is:

1. A gas separation method of separating a mixed gas, the gas separation method comprising:
   a) preparing a zeolite membrane complex that includes a porous support and a zeolite membrane formed on said support; and
   b) supplying a mixed gas that includes a high permeability gas and a trace gas to said zeolite membrane complex, the trace gas being lower in concentration than said high permeability gas, and permeating said high permeability gas through said zeolite membrane complex to separate said high permeability gas from other gases,
   wherein said trace gas contains an organic substance whose molar concentration in said mixed gas is higher than or equal to 1.0 mol %, and
   an adsorption equilibrium constant of said organic substance on said zeolite membrane is less than 150 times an adsorption equilibrium constant of said high permeability gas on said zeolite membrane.

2. The gas separation method according to claim 1, wherein
   said high permeability gas is hydrogen, nitrogen, oxygen, or carbon dioxide.

3. The gas separation method according to claim 1, wherein
   said zeolite membrane contains a zeolite crystal whose maximum number of membered rings is 8.

4. The gas separation method according to claim 1, further comprising:
   before said operation b), removing an organic substance from said mixed gas, an adsorption equilibrium constant of the organic substance on said zeolite membrane being 150 times or more the adsorption equilibrium constant of said high permeability gas on said zeolite membrane.

5. The gas separation method according to claim 1, wherein
   said mixed gas further includes a low permeability gas to which said zeolite membrane has lower permeability than to said high permeability gas, and
   in said mixed gas, said trace gas is lower in concentration than said low permeability gas.

6. The gas separation method according to claim 1, wherein
   said mixed gas contains one or more types of substances selected from among hydrogen, helium, nitrogen, oxygen, water, water vapor, carbon monoxide, carbon dioxide, nitrogen oxide, ammonia, sulfur oxide, hydrogen sulfide, sulfur fluoride, mercury, arsine, hydrogen cyanide, carbonyl sulfide, C1 to C8 hydrocarbons, organic acid, alcohol, mercaptans, ester, ether, ketone, and aldehyde.

* * * * *